United States Patent Office 3,012,854
Patented Dec. 12, 1961

3,012,854
INCORPORATING HYDRAZINE SULFATE OR DI-
HYDRAZINE SULFATE INTO SULFURIC ACID
Frank J. Plesmid, Westfield, N.J., assignor to E. I. du Pont de Nemours and Company, Wilmington, Del., a corporation of Delaware
No Drawing. Filed Mar. 25, 1958, Ser. No. 723,668
5 Claims. (Cl. 23—172)

This invention relates to compositions comprising sulfuric acid and a small amount of hydrazine sulfate, dihydrazine sulfate, or both of these, and to a method for producing such compositions.

For some uses of sulfuric acid, such as in a dehydration process for a gas, for example, carbon dioxide, the presence in the sulfuric acid of oxidizing compounds is highly objectionable. Even commercially produced sulfuric acid that is 99% $H_2SO_4$ typically contains amounts of oxidizing compounds which render the acid unsuitable for some proposed end uses.

I have found that these objectionable oxidizing compounds in sulfuric acid can be eliminated or converted to unobjectionable compounds by admixing with the sulfuric acid a small amount of hydrazine sulfate, dihydrazine sulfate, or both of these.

It is preferred as a matter of economics and facility that the sulfuric acid being treated be already of a relatively high degree of commercial purity, say on the order of 99% or more $H_2SO_4$. For 99% $H_2SO_4$ sulfuric acid, I have found that even a minute quantity of the sulfate compound or compounds provides some improvement by eliminating some of the oxidizing compounds present. There is thus no critical lower limit on the amount of compound to be added to the sulfuric acid for the treatment to be in some degree beneficial.

A standard test that is a conventional method for detecting the presence of oxidizing agents, e.g., nitric acid, in sulfuric acid is known as the Murray test. It is described in "Standards and Tests for Reagent and C.P. Chemicals," by Murray, 2nd edition, 1927, D. Van Nostrand Co., Inc., New York, New York, on pages 72, 74 and 76. Briefly the test comprises overlaying a 10 cc. 10% aqueous solution of the sulfuric acid with diphenylamine solution. If no blue color develops at the zone of contact of the two liquids within one hour, it is recognized that the sulfuric acid does not contain an objectionable amount of oxidizing compounds, and has passed the Murray test for absence of oxidizing compounds.

The amount of hydrazine compound therefore which is required to be added to the sulfuric acid can be an amount within the range from a very small quantity to an amount sufficient to improve the sulfuric acid to a condition where it can pass the Murray test. Even larger amounts of the hydrazine compound can of course be added to obtain further elimination of the oxidizing compounds, if increased purity is desired.

I have found in treating sulfuric acid that from 1 to 100 parts per million by weight, and preferably from 5 to 15 parts per million by weight, of the hydrazine compound is ordinarily satisfactory to improve 99% sulfuric acid sufficient to pass the Murray test. For efficiency and rapidity of treatment, a slight excess of hydrazine compound over the amount actually necessary can be effectively utilized.

It will be understood, therefore, that the exact amount of hydrazine compound incorporated in the sulfuric acid will depend on such variables as the concentration of the sulfuric acid, the amount of oxidizing compounds initially in the acid, and the effect desired, i.e., whether merely a small improvement is desired, or whether passing the Murray test is desired, or whether even greater improvement is desired. The precise amount can readily be determined by a person skilled in the art in accordance with the teachings set forth therein.

In an exemplary procedure for determining the quantity of, for example, hydrazine sulfate required to treat sulfuric acid so that it will pass the Murray test, a series of samples of a batch of sulfuric acid are treated with measured and varying amounts of the hydrazine sulfate. The sample that just passes the Murray test can be used to estimate the effective quantity, plus a suitable slight excess if desired, for scale up to treatment of larger batches of sulfuric acid.

Although all undesirable oxidizing compounds present in sulfuric acid and which can be eliminated by incorporation of monohydrazine sulfate or dihydrazine sulfate have not been identified, such oxidizing compounds can include nitric acid, persulfuric acid, $Fe^{+++}$, and other known oxidizing compounds detectable by the Murray test.

The two compounds useful alone or together in the improvement of sulfuric acid according to the process of this invention are hydrazine sulfate, identified as $$N_2H_4.H_2SO_4$$

and dihydrazine sulfate, identified as $(N_2H_4)_2.H_2SO_4$. 
Use of these compounds is believed to be singularly advantageous. Not all reducing agents, even for strong oxidizing agents, are equivalent or even operable for applicant's purpose. The absence of a synergistic effect obtained by these compounds in this invention with each other or with other compounds has not been convincingly proven.

A particular advantage of this invention resides in the fact that monohydrazine sulfate and dihydrazine sulfate leave no contaminating substances after incorporation within the sulfuric acid. Additionally, they are relatively safe and easy to handle.

The concentration of the sulfuric acid at the time of treatment is not critical. The Murray test is equally applicable to dilute, concentrated and fuming sulfuric acid.

This invention will be further explained but is not intended to be limited by the following illustrative examples:

*Example 1*

Hydrazine sulfate in an amount of 0.001 gram was added to 100 grams of 99% $H_2SO_4$ sulfuric acid. The ratio of the components, as can be seen, was 10 parts by weight of hydrazine sulfate per million parts by weight of acid. The treated acid was allowed to stand at room temperature for one hour after which it passed the Murray test for absence of oxidizing compound.

This example can be repeated substituting dihydrazine sulfate for all or part of the hydrazine sulfate with completely satisfactory results. The example can also be repeated utilizing as little as one part per million or less or as much as one hundred parts per million or more of the treating compound, depending on the initial amount of oxidizing compounds in the sulfuric acid and the effect desired.

*Example 2*

To 15,000 pounds of 99% $H_2SO_4$ sulfuric acid at 90° F. in a half-filled tank truck was added 140 grams of dihydrazine sulfate. For convenience, the dihydrazine sulfate can be dissolved in, for example, two gallons of 99% sulfuric acid, prior to adding to the tank truck. The tank truck was then filled with 15,000 pounds additional 99% $H_2SO_4$ sulfuric acid and the contents mixed with an air stick for 10 minutes. The treated acid sampled 10 minutes and 24 hours after mixing passed the Murray test for absence of oxidizing compounds.

The embodiments of the invention in which an exclusive property or privilege is claimed are defined as follows:
1. In a process for treating sulfuric acid containing an oxidizing compound of the group consisting of nitric acid, persulfuric acid, and compounds which form ferric ions in the acid, in an amount sufficiently large that the acid does not pass the Murray test, the steps comprising adding to and mixing with the acid at ordinary atmospheric temperature a salt of the group consisting of hydrazine sulfate and dihydrazine sulfate and holding the mixture at least 10 minutes, the amount of said hydrazine compound added being sufficient to eliminate the oxidizing compound and cause the acid to pass the Murray test after treatment as described.

2. A process of claim 1 wherein the amount of hydrazine salt added is from 1 to 100 parts per million parts of sulfuric acid.

3. A process of claim 2 wherein the hydrazine salt added is hydrazine sulfate.

4. A process of claim 2 wherein the hydrazine salt added is dihydrazine sulfate.

5. A process of claim 2 wherein the amount of hydrazine salt added is from 5 to 15 parts per million parts of sulfuric acid.

References Cited in the file of this patent

UNITED STATES PATENTS

| | | |
|---|---|---|
| 2,682,446 | Weiler | June 29, 1954 |
| 2,783,130 | Nicolaisen | Feb. 26, 1957 |

OTHER REFERENCES

Wyld: Manufacture of Sulfuric Acid Chamber Process, Van Nostrand Co., 1924, pages 362–363.

Audrieth and Ogg: "The Chemistry of Hydrazine," 1951, John Wiley and Sons, pages 3, 4, 117, 119, 122, 123, 221 to 226.